United States Patent [19]
Van Dyck et al.

[11] 3,803,545
[45] Apr. 9, 1974

[54] ULTRASONIC MEASUREMENTS AND ULTRASONIC MANOMETER

[75] Inventors: Donald Edwin Van Dyck, Passaic; Jose Thomas Weber, Jr., Clark, both of N.J.

[73] Assignee: Pennwalt Corporation, East Orange, N.J.

[22] Filed: May 17, 1971

[21] Appl. No.: 144,649

Related U.S. Application Data

[62] Division of Ser. No. 787,706, Dec. 30, 1969, Pat. No. 3,589,196.

[52] U.S. Cl. ................................. 340/10, 310/9.7
[51] Int. Cl. ......................................... H04b 13/00
[58] Field of Search .......... 340/10, 8 LF; 333/30 R; 310/9.7

[56] References Cited
UNITED STATES PATENTS

| | | | |
|---|---|---|---|
| 3,158,762 | 11/1964 | Horan | 340/10 |
| 3,206,698 | 9/1965 | Allen et al. | 333/30 R |
| 2,626,992 | 1/1953 | Holman | 340/10 |
| 3,025,359 | 3/1962 | Schilling et al. | 340/10 UX |
| 3,167,668 | 1/1965 | Nesh | 340/10 X |
| 2,753,528 | 7/1956 | Ashby | 333/30 R |
| 2,764,741 | 9/1956 | Banta | 333/30 R |
| 2,095,376 | 10/1937 | Bechman | 310/9.7 |
| 2,592,134 | 4/1952 | Firestone | 330/30 R |
| 1,995,257 | 3/1935 | Sawyer | 310/9.7 |
| 1,692,074 | 11/1928 | Burtis | 310/9.7 |

*Primary Examiner*—Samuel Feinberg
*Assistant Examiner*—H. J. Tudor

[57] ABSTRACT

Method and apparatus for measuring the difference in length between two paths through sound transmitting medium.

In one embodiment, a U-tube manometer has transducers placed near the bottoms of the columns of liquid in the two manometer legs. An electronic circuit causes the transducers to emit simultaneous sound signals directed toward the tops of the columns. A counter accumulates a count of the pulses produced by a high frequency oscillator between the time the echo of the sound signal in the short column of liquid is received by its transducer and the time the echo in the long column of liquid is received by its transducer. The count is indicative of the difference in height between the two columns, and thus of the difference between the pressures applied to the two manometer legs. The count may be displayed in conventional units of pressure, or it may be utilized in any other suitable manner.

In alternative embodiments, the sound signals may be allowed to travel two or more times between the transducers and the free surfaces of the columns before being used to initiate or terminate the counting of high frequency pulses.

The manometer is enclosed in a double walled cabinet and the temperature of the liquid columns is maintained constant by a heater which is controlled by a system providing both off-on and proportional heat controls.

The U-tube manometer may be filled with mercury. A transducer satisfying the special requirements due to the use of mercury is also described.

3 Claims, 14 Drawing Figures

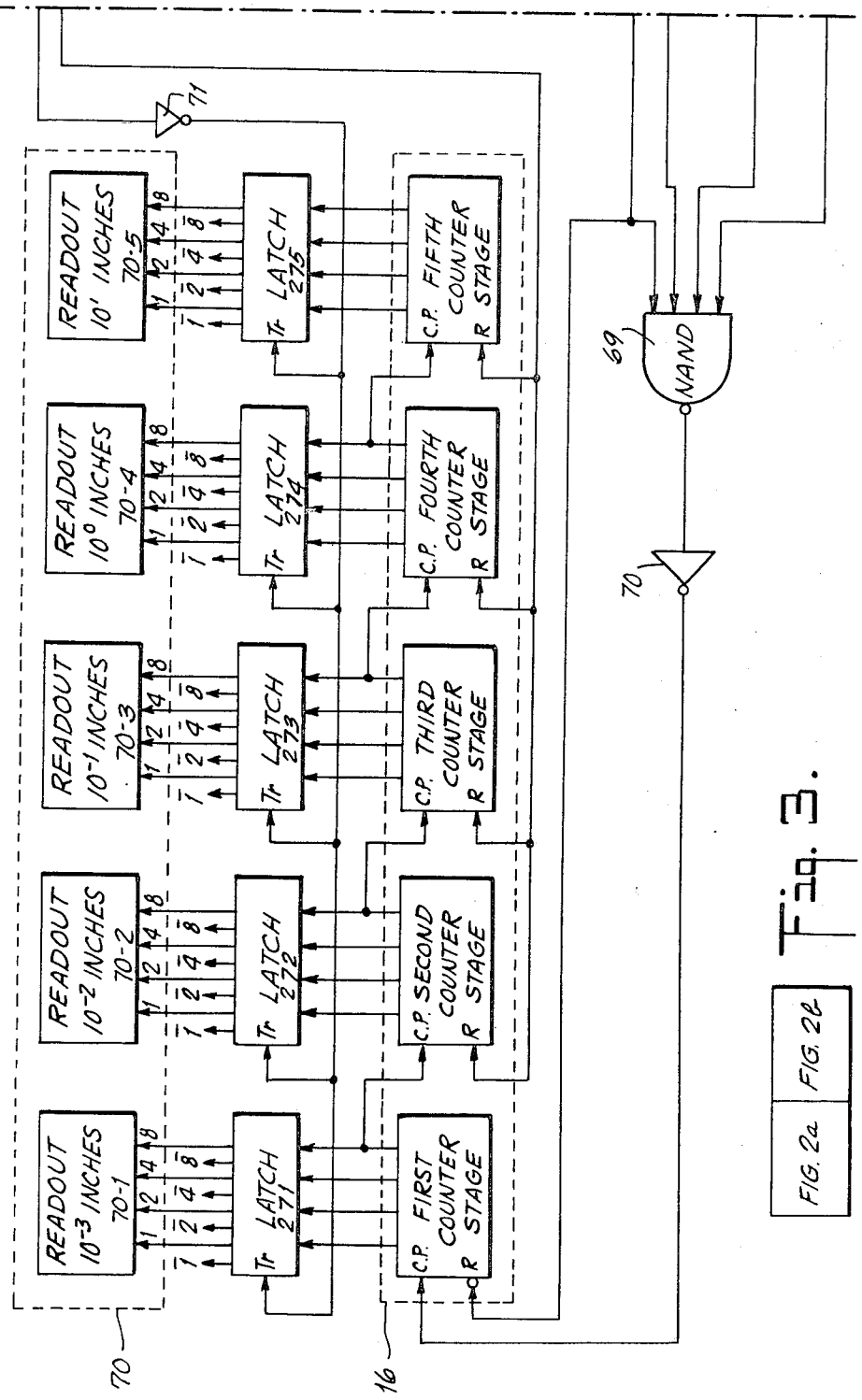

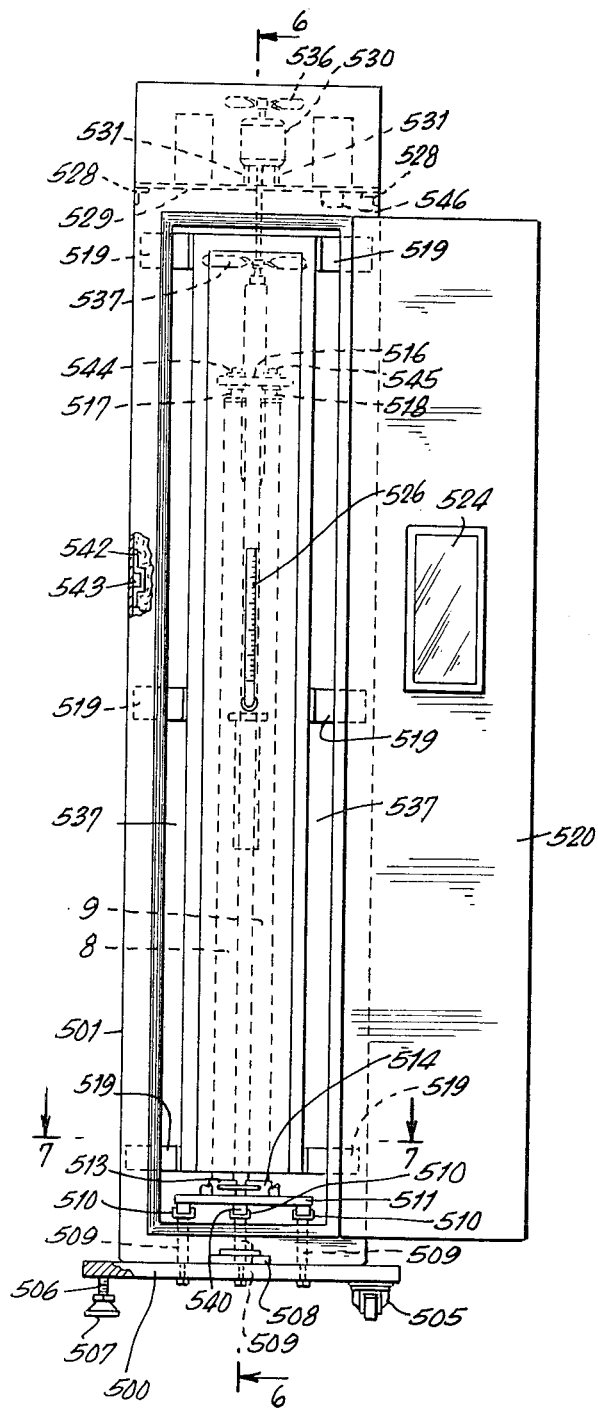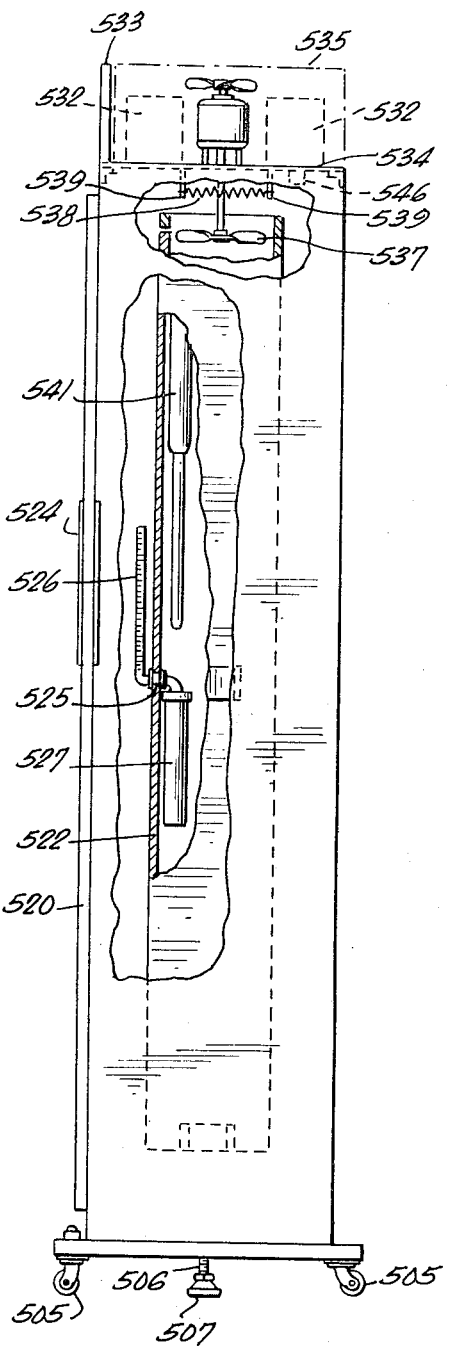

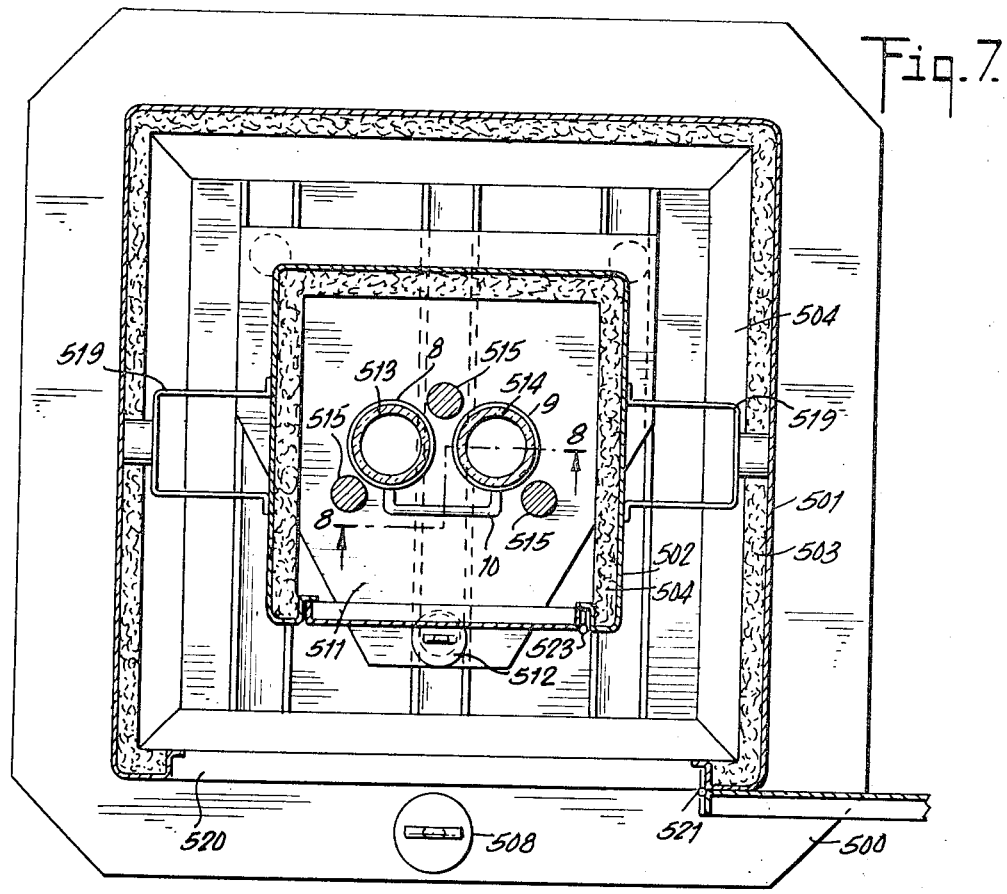
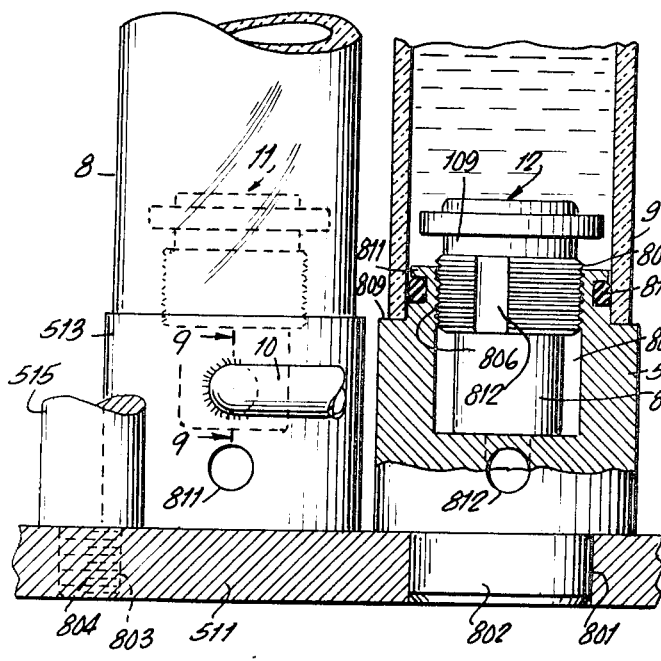
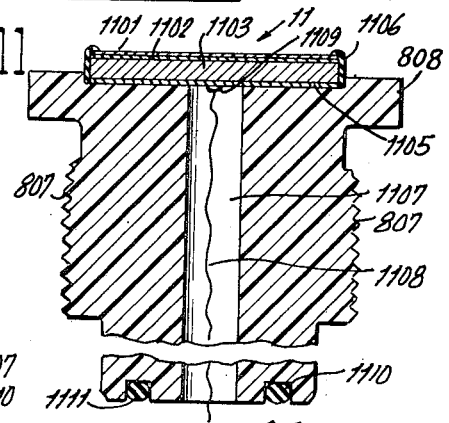
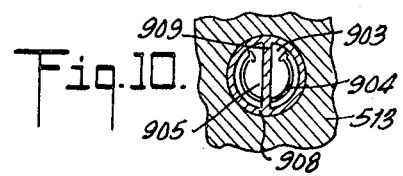

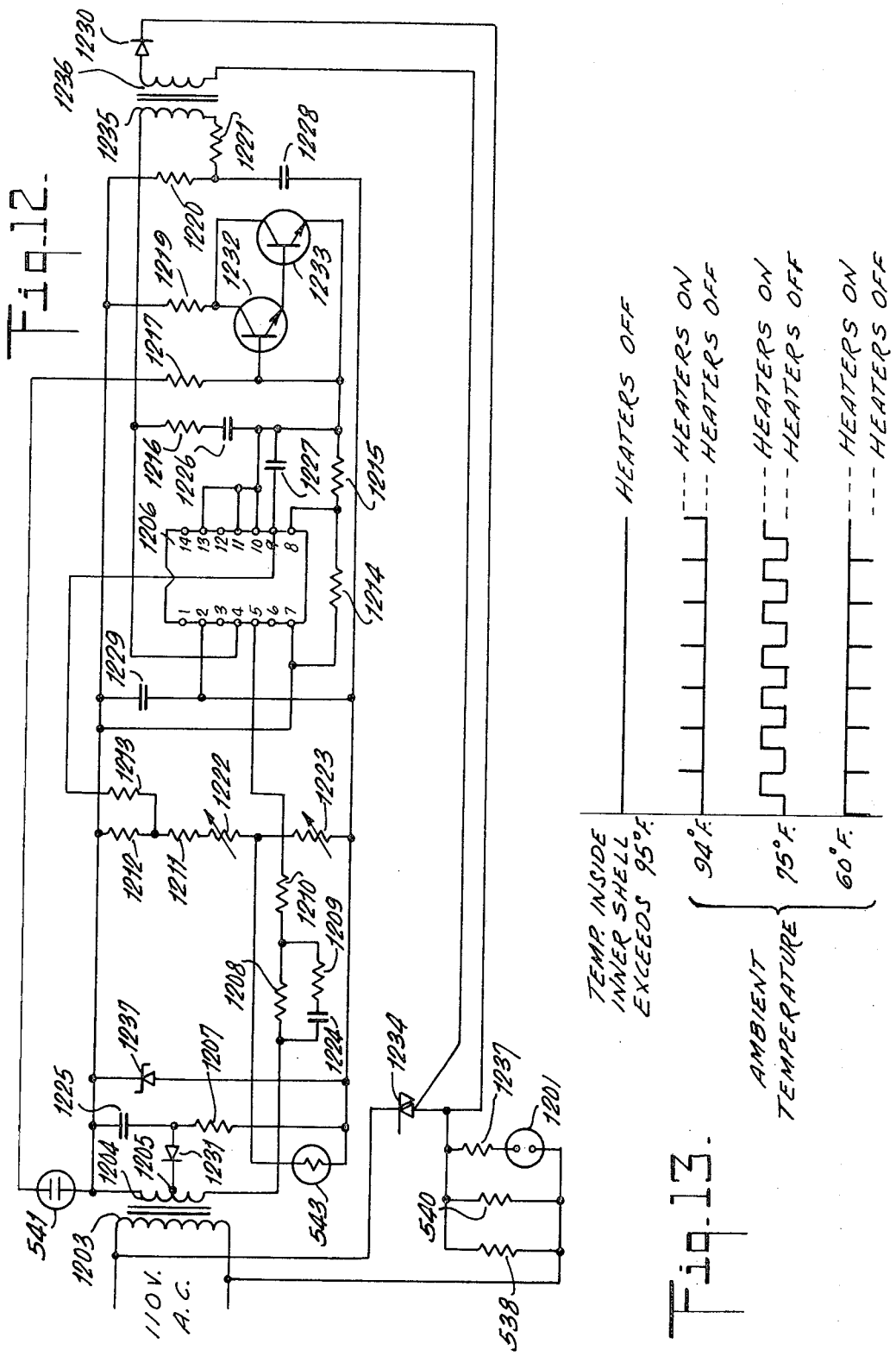

ULTRASONIC MEASUREMENTS AND ULTRASONIC MANOMETER

This is a divisional application of Application Ser. No. 787,706, filed Dec. 30, 1968, now U.S. Pat. No. 3,589,196.

BACKGROUND OF THE INVENTION

1. Field of the Invention

The invention relates to measuring the difference in length between two paths through a sound transmitting medium by measuring the time difference of the travel of sound signals through the two paths.

The invention includes devices which measure, on the basis of the travel time of sound signals, the difference in height between the liquid columns in the two legs of a U-tube manometer, and thus it relates to measuring the difference between the pressures applied to the two manometer legs.

In order to keep the measurement independent of ambient temperature changes, the liquid used in the U-tube manometer must be kept at a predetermined temperature.

It is common to use mercury as the liquid in U-tube manometers and it has been a problem to construct transducers for conversion between electrical and sound energy which can operate satisfactorily in mercury over long periods of time.

2. Description of the Prior Art

Ultrasound measurements have been utilized in the past to measure the length of paths through sound transmitting media. The prior art, however, has typically used a "ring-around" system in which sound pulses are repeatedly emitted from a transducer and reflected as echoes from a reflective surface. Upon reception of one sound echo by the transducer, a new driving pulse is applied to the same transducer. The frequency at which driving pulses are applied to the transducer has been used as an indication of the length of the path between the transducer and the reflective surface. Examples of such systems are described in U.S. Pat. No. 3,115,615 to Saper, and in U.S. Pat. No. 3,100,885 to Welkowitz et al. The patent to Saper discloses also the feature of sending additional sound pulses across a path of fixed length through the same medium as the principal sound pulses and in the same manner, and then using the frequency of emitting these additional pulses as a correcting factor for temperature and density variations of the medium.

The copending application of Vito C. Farese, Ser. No. 589,421, filed Oct. 25, 1966 now U.S. Pat. No. 3,486,381, issued Dec. 30, 1969, and assigned to the assignee of the present application, also shows a "ring-around" system in which a new sound signal is emitted by a transducer upon reception of the reflected echo of the previously emitted signal. The time required to emit a predetermined number of such sound signals is compared with a fixed or variable standard.

SUMMARY OF THE INVENTION

The invention is in methods and apparatus for measuring the difference in length between two paths through a sound transmitting medium by measuring the difference in propagation time of sound signals through the two paths. One extremity of each path is defined by the sound transmitting surface of a transducer; the other extremity of each path is defined by a sound reflective surface. The two transducers are caused to emit simultaneous sound signals. The sound signals transmitted along the two paths are reflected by the reflective surfaces and begin propagating back toward the transducers as echo signals. The echo signal of the shorter path reaches its transducer first and causes the electrical pulses of a high frequency oscillator to be applied to a counter. At some later time, determined by the difference in length between the two paths, the echo reflected by the reflective surface along the longer path reaches the transducer associated with the longer path. This event causes discontinuance of the pulses applied to the counter. The count contained in the counter at this time is proportional to the difference in length between the two paths. The frequency of the high frequency oscillator may be chosen such that the count will be in conventional units of length. This count may be utilized by displaying it, by printing it, or by directing it to other kinds of utilization devices. The measurement may be repeated at preset intervals.

In the embodiment described in detail below, the invention is utilized as a high accuracy and high precision mercury filled U-tube manometer, where the difference in height between the two mercury columns is representative of the difference between the pressures applied to the two manometer legs. A transducer is placed near the bottom of each column of mercury with its sound-emitting surface directed toward the top of the column; the free surface of the mercury column is the sound reflective surface. Measurements may be initiated at preset intervals by electrical signals generated by a sampling oscillator, or, alternatively, at random intervals by a manual switch. A high frequency master clock oscillator is running continuously.

At the first clock pulse from the master clock oscillator appearing after the initiating signal, the two transducers at the bottoms of the mercury columns are caused to emit simultaneous sound signals. The sound signal in the short column of mercury is reflected by its free surface and returns as an echo to its transducer where it is converted to an electrical signal in the form of a series of sinusoidal waves. As the second positive-going portion of this electrical wave signal passes through zero; the high frequency master clock oscillator is connected to a counter which begins accumulating a count of the clock pulses.

At some later time, the echo signal reflected from the free surface of the long column of mercury reaches the transducer therein, and is converted to an electrical signal in the form of a second series of sinusoidal waves. At the occurrence of the second positive-going voltage section of this series of waves, the master clock oscillator is disconnected from the counter.

The counter at this time contains a number which is proportional to the differeence in height between the two mercury columns. This number is also proportional to the difference between the pressures applied to the two manometer legs.

Depending on the frequency choice for the master clock oscillator, the count may be read directly in units of length or in units of pressure. The accumulated count may be directed to display units, to printers, or to other types of utilization devices.

The transducer for the shorter column of mercury may be intentionally placed at a somewhat higher level then the transducer for the long column. This difference in height, as well as any other differences in height between the two transducers due to manufacturing tolerances or due to the orientation of the columns in a particular placement, are compensated by the use of a variable time delay between the short column transducer and the counter. The delaying of the signal from the short column transducer, which signal is used to connect the master clock oscillator to the counter, has an effect equivalent to that produced by lowering the physical position of the short column transducer in relation to the position of the long column transducer. When the two legs of the manometer are connected to the same source of pressure, the time delay may be adjusted until a measurement results in the zero count contained in the counter.

The use of mercury as the working liquid in the manometer places special requiremens on the transducers. A novel transducer, designed for use in mercury, and designed in view of the high accuracy and high precision requirements of the invented manometer is therefore a part of this invention.

The transducer comprises a top plate of platinum which is wetted by the mercury for good electrical and sound contact, but is not amalgamated by it. A silver filled epoxy layer connects the platinum plate to the silver fired top face of a lead zirconate-lead titanate crystal and holds the plate and the crystal together. This structure is sealed on the sides of the plate, of the silver filled epoxy layer, and of the crystal by material such as "Pliobond" in order to prevent seepage of mercury, and is then cemented to a phenolic mount which restricts the propagation of sound signals to the direction toward the free mercury surface.

To maintain high accuracy of measurement, the working liquid must be kept near a predetermined temperature. The manometer is therefore enclosed in a double walled cabinet and maintained at constant temperature by counter flow of air heated by a system employing both off-on and proportional heat controls. The heat control system is responsive to the temperature levels both inside the manometer enclosure and outside the outer wall of the cabinet.

BRIEF DESCRIPTION OF THE DRAWINGS

FIGS. 2a and 2b, when connected side by side as shown in FIG. 2, comprise a more detailed wiring diagram of the embodiment shown generally in FIG. 1.

FIG. 5 is a partly elevational and partly cross-sectional frontal view of the cabinet which houses the structure illustrated in FIGS. 1 and 2, and also houses a heat control system for keeping the temperature of the manometer liquid at a predetermined level.

FIG. 6 is a partly elevational and partly cross-sectional side view along lines 6—6 of the structure illustrated in FIG. 5.

FIG. 7 is a cross-sectional plan view along lines 7—7 of the structure illustrated in FIG. 5.

FIG. 8 is a partly elevational and partly cross-sectional view of the bottom ends of the manometer legs and of cups used for supporting the legs and also for supporting transducers.

FIG. 9 is a cross-sectional detail along lines 9—9 of FIG. 8 showing the construction of a flapper valve.

FIG. 10 is a cross-sectional view along lines 10—10 of FIG. 9.

FIG. 11 is a cross-sectional view of a transducer embodying certain features of the invention.

FIG. 12 is a wiring diagram of an electrical circuit used for maintaining constant predetermined temperature inside the cabinet illustrated in FIGS. 5–7.

FIG. 13 illustrates in graphic form the duty cycles of heating elements controlled by the circuit shown in FIG. 12.

DETAILED DESCRIPTION

Figure 1:
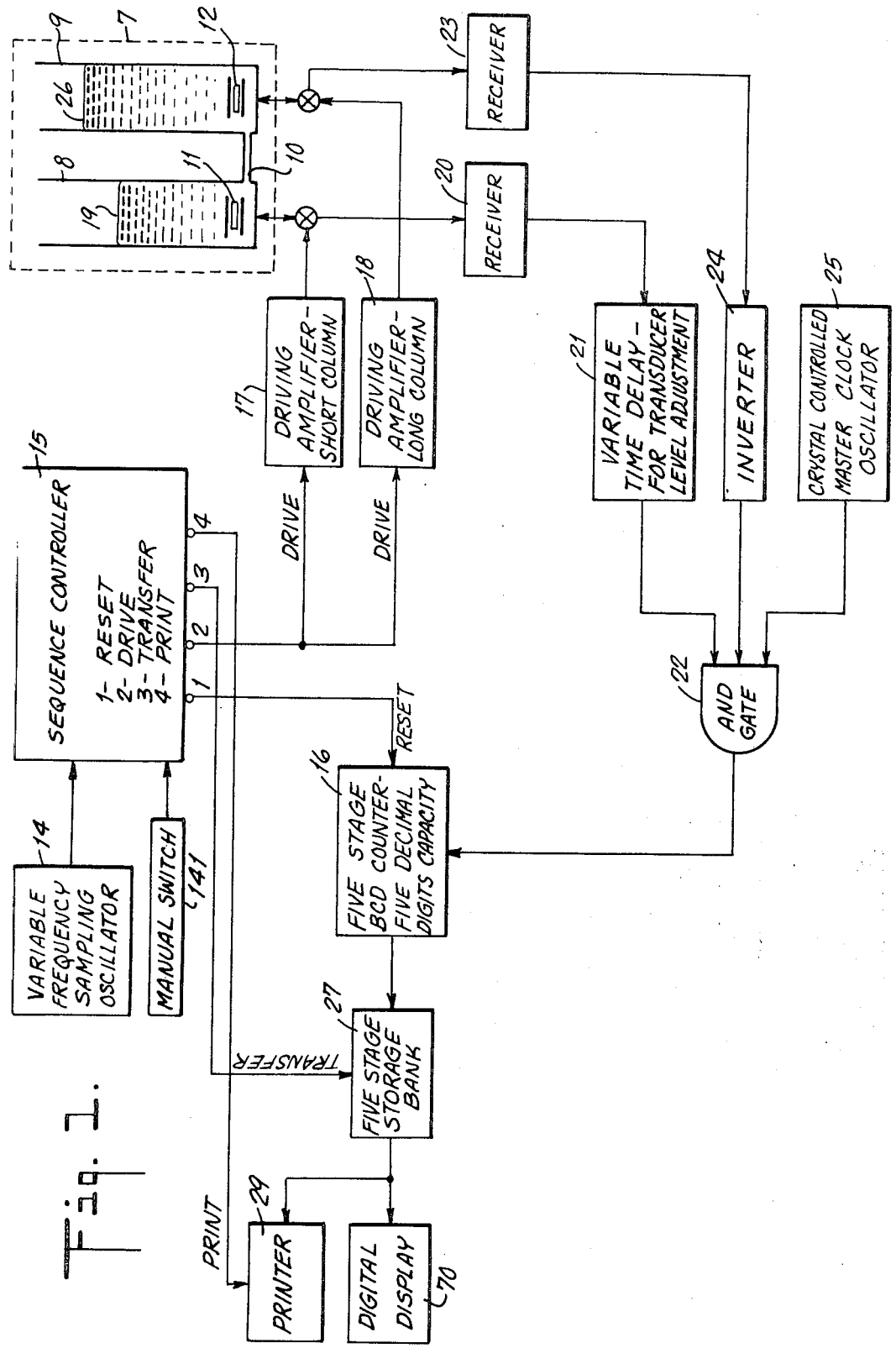
FIG. 1 is a generalized block diagram of a U-tube manometer embodiment of the invention.

FIG. 1 shows in schematic form a U-tube manometer 7 comprising vertical tubes 8 and 9 which are interconnected near their bases by a tube 10. The vertical tubes 8 and 9 are partially filled with a liquid. For the purposes of this description, mercury will be the liquid used in the manometer, it being understood that other suitable liquids may be used instead. Transducers 11 and 12 are mounted near the bases of the tubes 8 and 9 respectively such that the top transducer faces, which are sound-emitting surfaces, are covered by the mercury. The free surface of the mercury in the tube 8 is identified by the reference numeral 19; the free surface of the mercury in the tube 9 is identified by the reference numeral 26.

Fluid pressure is applied to the free surfaces 19 and 26; the higher fluid pressure is applied to the surface 19.

When an electrical signal is applied to the transducers 11 and 12, it is converted therein to sound signals which begin propagating upward through the mercury. The sound signals in the downward direction are damped by mounts which support the transducers 8 and 9. The sound signal in each mercury column propagates toward the free surface, is reflected from it, and then propagates downward toward the exposed face of the transducer as an echo signal. When the echo reaches the transducer, it is converted therein to an electrical signal.

At constant temperature and gravity, the propagation speed of sound signals in mercury is a constant. Therefore, the time that a sound signal takes to travel through a column of mercury of finite length is indicative of the length of the column. Also, the difference between the travel times of the two sound signals through two columns of mercury of finite lengths, at constant temperature and gravity, is indicative of the difference between the heights of the columns. Since the height difference of the two columns of mercury in a U-tube manometer is an indication of the difference between the pressures applied to the top surfaces of the two columns, the sound signal propagation time difference is then an indication of the difference between the two pressures.

The system illustrated in FIG. 1 includes, in addition to the U-tube manometer described above, a number of electronic components designed to measure the difference between the propagation times of the sound signals.

The system is activated by a variable frequency sampling oscillator 14, or by a manual switch 141. The sampling oscillator 14 produces an initiating signal as often as desired for the particular use to which the system of FIG. 1 is put. In one application, the frequency of the sampling oscillator 14 has been set to ten initiating signals per second. The initiating signal, from the sampling oscillator 14 or from the manual switch 141, is applied to a sequence controller 15 which has four output lines identified by reference numerals 1 through 4. The sequence controller 15 places initiating signals on the output lines in the sequence 1, 2, 3, 4.

The output 1 which is labeled RESET is initiated first. It causes each of the five stages of a counter 16 which operates in the binary coded decimal system to be set to a state corresponding to decimal 9. Each stage of the counter 16 has the capacity of one decimal digit.

The sequence controller 15 next initiates its output 2 which is labeled DRIVE. This causes driving amplifiers 17 and 18 to apply essentially simultaneous electrical signals to transducers 11 and 12 respectively.

The transducers 11 and 12 have similar characteristics and emit essentially simultaneous sound signals. The echo reflected from the free surface 19 is received at the transducer 11 and is converted therein to an electrical signal which is in the form of a series of sinusoidal waves. This electrical signal is applied to a receiver 20 which shapes and amplifies it. The output of the receiver 20 is applied to a variable time delay element 21. After the preset time delay of the element 21, this electrical signal is applied to one of the inputs of an AND-gate 22.

At this time the transducer 12 has not yet received the echo reflected by the free surface 26, because of the greater height of the mercury column in the tube 9. Hence, at this time receiver 23 which is similar to the receiver 20 has no electrical signal applied to its input and there is no signal applied by it to the input of an inverter 24. The output of the inverter 24 is therefore at this time a "signal" which is applied to the AND-gate 22.

The third input to the AND-gate 22 comes from a crystal controlled master clock oscillator 25 which produces pulses at a very high frequency. The AND-gate 22 is thus enabled with every pulse produced by the clock oscillator 25. Thus, beginning at this time, each pulse from clock oscillator 25 is applied to the counter 16.

At some later time, the echo reflected by the surface 26 reaches the transducer 12 and is converted therein to an electrical signal in the form of a series of sinusoidal waves. The electrical signal is amplified and shaped by the receiver 23 and is applied to the input of the inverter 24. The output of the inverter 24 changes at this time to a "no signal," thus disabling the AND-gate 22.

The counter 16 is thus allowed to accumulate a count of the pulses produced by the clock oscillator 25 between the reception of the echo signal by the short column transducer 11, plus the time delay of the element 21, and the time of reception of the echo signal by the long column transducer 12. This count is proportional to the difference in height between the two mercury columns and hence to the difference between the fluid pressures applied to the surfaces 19 and 26.

After a time long enough to accommodate the greatest possible height difference between the two mercury columns, the sequence controller 15 enables its output 3 which is labeled TRANSFER. This enabling signal is applied to a five stage storage bank 27 which is connected to the five stage counter 16 and at that time contains the count which has been accumulated by the counter.

Upon receipt of the TRANSFER signal, the storage bank 27 applies its contents to a digial display 70 and to a printer 29. The digital display 70 immediately displays the count accumulated in the counter 16.

At some later time the sequence controller 15 enables its output 4 which is labeled PRINT 4. This enabling signal is applied to the printer 29 and allows it to process the information supplied to it by the storage bank 27. The printer 29 prints out the contents of the storage bank 27. No code converters are shown between the storage bank 27 and the digital display 70 and printer 29, it being understood that code converters may be used as desirable for the particular application.

Depending on the frequency chosen for the master clock oscillator 25, the digital display 70 may read the difference in height between the two mercury columns in the manometer legs in conventional units of length or of pressure, or simply as a count proportional to the height difference.

Figure 2B:
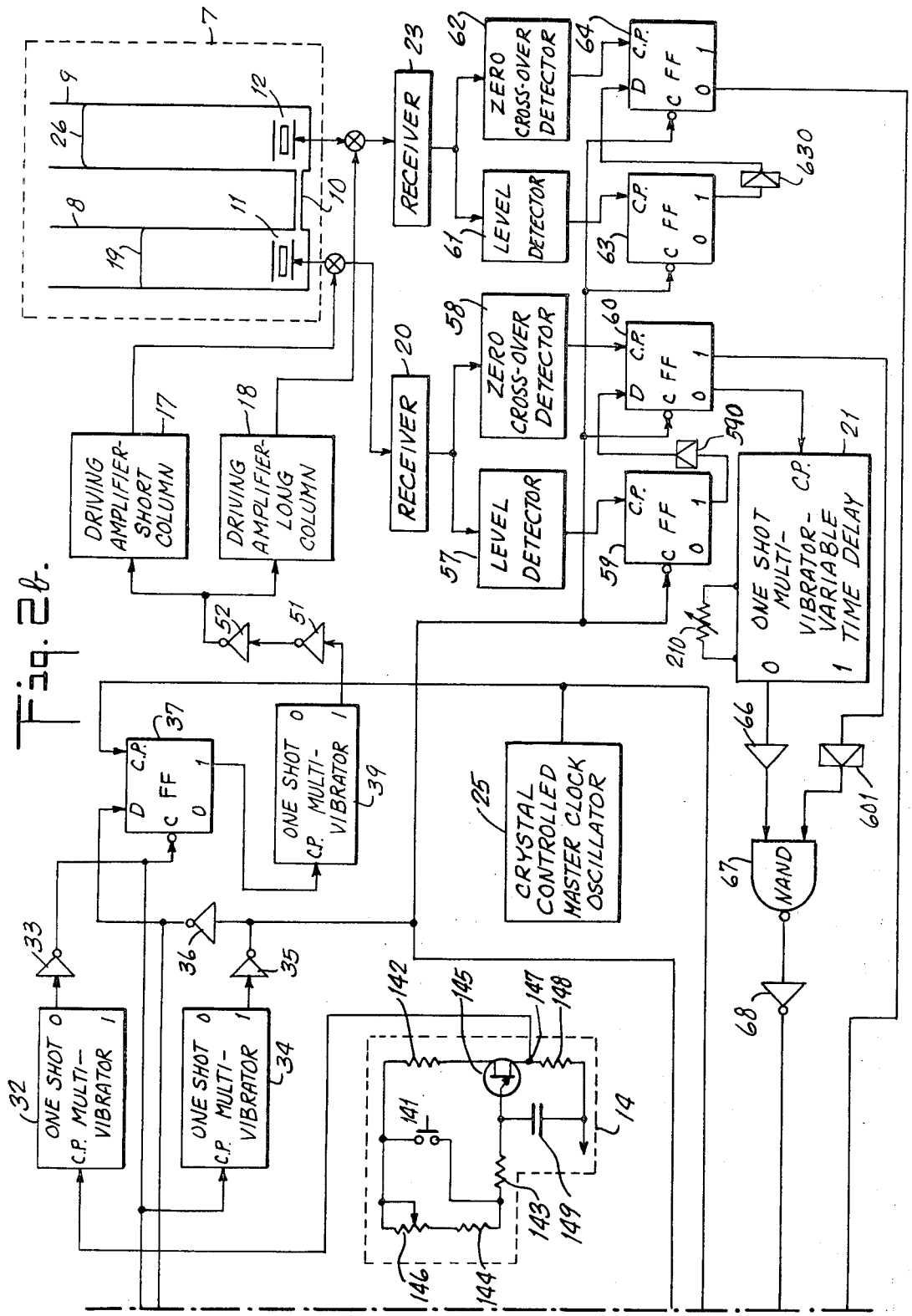

FIGS. 2, 2a and 2b

FIG. 2 illustrates how FIGS. 2a and 2b may be arranged side by side to provide a more detailed diagram of the electronic system cooperating with the manometer 7 of FIG. 1.

The electronic system described herein is implemented primarily in solid state integrated circuits using binary logic. Reference will be made to binary zero and binary one signals; it being understood that binary "zero" refers to a signal at a particular voltage level, and binary "one" refers to a signal at another, different voltage level. It is within the scope of this invention to use ternary or other logic, so long as the function performed is in substance the same as described herein.

The sampling oscillator 14 may be a conventional unijunction transistor relaxation oscillator comprising unijunction transistor 145, balancing resistors 142, 143, 144 and 148, a variable resistor 146 and a capacitor 149. The frequency of the sampling oscillator can be varied by varying the resistor 146. A typical frequency may be ten cycles per second. The output of the sampling oscillator 14 is taken from the base 147 of the unijunction transistor 145. The output is a pulse of very short duration as compared to the period of the cycle, appearing at a frequency determined by the characteristics of the oscillator components (see FIG. 4).

A switch 141 may be provided in the oscillator 14 which, when closed, causes the immediate appearance of a pulse at the output 147 of the oscillator.

Figure 4:
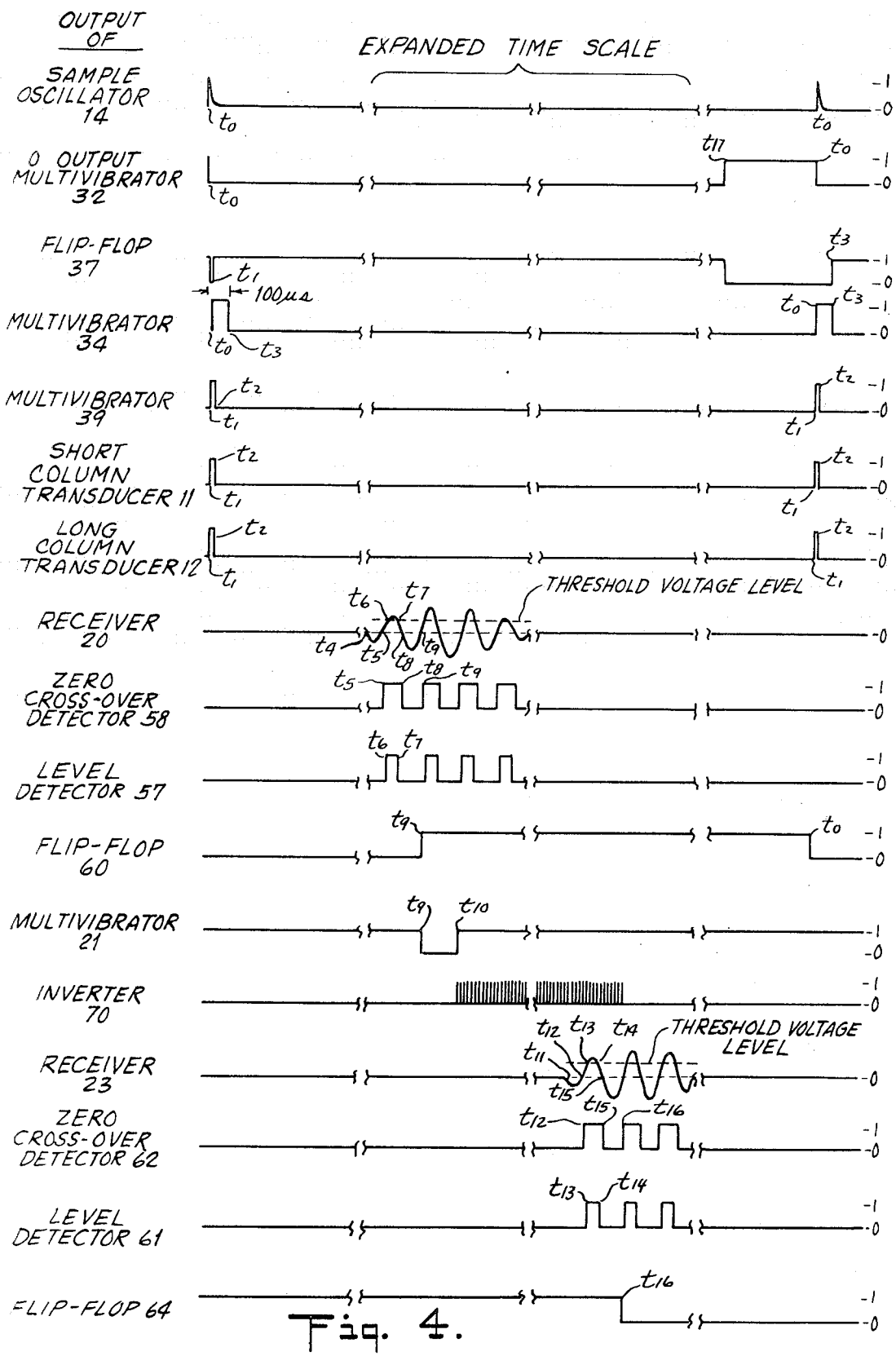
FIG. 4 is a timing diagram of various signals generated during the operation of the embodiment illustrated in FIGS. 1 and 2.

One shot multivibrators 32, 34, and 39 may be integrated resistor-transistor logic elements which, when energized by a rising edge appearing at their control pulse inputs C.P., produce a binary 1 signal at their 1 output which lasts for a time span determined by their internal characteristics (see FIG. 4). Their 1 and 0 outputs always carry complementary signals, i.e., when the 1 output carries a binary 1 signal, the 0 output carries a binary 0 signal; when the 0 output carries a binary 1 signal, the 1 output carries a binary 0 signal.

Inverters 33, 35, 36, 51, 52, 68, 70 and 71 may be integrated circuits of standard design whose output is always the binary complement of the input.

One shot multivibrator 21 may be a diode-transistor micrologic integrated circuit which, when triggered by the trailing edge of a binary 1 level signal applied to its control pulse C.P. input, produces a binary 1 signal of predetermined duration at its 1 output (see FIG. 4). Its 1 and 0 outputs always carry complementary binary signals. A variable resistor 210 is connected to multivibrator 21 so as to vary the predetermined duration of the binary signal at the output of the multivibrator. For example, a commercially available multivibrator produced by Fairchild and identified by Model No. DTμL9951 may be used for multivibrator 21. In this case, the resistor 210 may be an external variable resistor connected between suitable contact pins of the integrated circuit in order to vary its time constant.

Receivers 20 and 23 amplify and shape the electrical signals produced by the transducers 11 and 12 respectively and may be amplifiers of standard design.

Level detectors 57 and 61 and zero cross-over detectors 58 and 62 may be integrated differential voltage comparators. Each of the zero cross-over detectors 58 and 62 produces a binary 1 level signal at its output when the voltage applied to its input passes through zero in the positive-going sense. The signal at the output of the zero cross-over detector stay at a binary 1 level until the input voltage passes through zero in the negative-going sense. Each of the level detectors 57 and 61 is a threshold element which produces an output signal of binary 1 level which lasts for as long as the voltage of the signal at the input exceeds a certain positive level.

Flip-flops 37, 60 and 64 are D-type, edge-triggered flip-flops having Clear input C, input D and complementary 1 and 0 outputs. This type flip-flop is prepared for switching by the appearance of a binary 1 signal at its D input, but is switched to a binary 1 state only at the subsequent or concurrent appearance of a positive-going edge at its clock pulse input C.P. The internal circuitry of this type flip-flop is such that it is reset to binary 0 state by a binary 0 signal at its Clear input C. These flip-flops may be commercially available integrated circuits.

Each of flip-flops 59 and 63 may be an integrated circuit with internal characteristics such that a binary 0 signal applied to the Clear input C resets in its binary 0 state. A positive-going edge applied to the clock pulse C.P. input sets it to its binary 1 state.

Delays 590, 601 and 630 may be commercially available delay elements which do not change the logical nature of the signals passing through them.

Amplifier 66 may be an electronic amplifier of standard design. It does not change the binary nature of the signal applied to its input.

NAND-gates 67 and 69 may be standard integrated circuits with the characteristic that the output is a binary zero when each of the inputs is a binary 1 signal; the output is a binary 1 signal when any of the input signals is a binary zero signal.

Crystal controlled master clock oscillor 25 may be a high frequency oscillator of standard design. One typical operating frequency is 28.25025 megacycles per second. The crystal which controls its frequency may be changed.

Counter 16 is a five stage counter which operates in the binary coded decimal system and exceeds the required capacity of five decimal digits. Its second, third, fourth, and fifth stages may be monolithic integrated circuits, such as for example the type SN 7490N integrated circuit produced by Texas Instruments, each consisting of a sufficient number of flip-flops for the required capacity of one decimal digit. These stages are reset to states corresponding to decimal 9 by the appearance of a binary 1 signal at their inputs labelled R.

The first counter stage is similar to the subsequent four stages in that it operates in the binary coded decimal number system and exceeds the required capacity of one decimal digit (it has four binary flip-flops). It differs from the subsequent stages in that it is reset to a state corresponding to decimal 9 when a binary 0 signal is applied to its input labelled R. The first counter stage is triggered to its next subsequent stage by binary 1 pulse signals which may range up to 30 megacycles per second in frequency. This stage may also be an integrated circuit, such as for example, the integrated circuit type Ser. No. 7470N produced by Texas Instruments.

Driving amplifiers 17 and 18 may be pulse amplifiers of standard design. Their purpose is to produce essentially simultaneous electrical signals of the shape and magnitude required by the transducers 11 and 12.

Latches 271, 272, 273, 274 and 275 are memory elements each having four bistable flip-flops and each latch having complementary outputs. Each of the latches stores the count accumulated in its associated counter stage until a binary 1 signal is applied to its input labelled Tr, at which time the information contained in the latch is placed on its complementary output leads.

Display 70 consists of five stages 70-1, 70-2, 70-3, 70-4 and 70-5, each associated with one of the latches. Each of the readout stages has a Nixie tube display for one decimal digit and a standard BCD-to-decimal decoder (not shown) which decodes the BCD output of its associated latch and drives the Nixie display.

OPERATION OF FIGS. 2a AND 2b

The operation of the system illustrated in FIGS. 2a and 2b will be explained by supplemental reference to FIG. 4 which is a timing diagram of the outputs of some of the electronic components of these figures.

An operating cycle is initiated by the appearance of a positive going pulse at the output 147 of the sampling oscillator 14. This pulse is produced periodically, for example once every 100 milliseconds, for as long as the oscillator 14 is connected to a suitable source of electrical energy (not shown). Alternatively, a pulse at the output 147 of the oscillator 14 will be produced instantaneously upon the manual closing of the switch 141.

The pulse output of the oscillator 14 is illustrated in FIG. 4 and occurs at time $t_0$. The pulse is applied to the input C.P. of the one shot multivibrator 32 and sets the multivibrator to its binary 1 state causing the appearance of a binary 1 signal at the 1 output and a binary 0 signal at the 0 output of the multivibrator 32, as illustrated in FIG. 4. The response time of the multivibrator 32 is so small that it can be disregarded for the purposes of this description.

The binary 0 signal which is present at the 0 output of the multivibrator 32 immediately after time $t_0$ is applied to the inverter 33, emerges therefrom as a binary 1 signal and is applied to the Clear input C of the flip-flop 37, resetting that flip-flop to its binary 0 state.

The same binary 1 signal is applied to the input of the one shot multivibrator 34 and produces a binary 1 signal at the 1 output thereof, as illustrated in FIG. 4.

The binary 1 signal from the 1 output of multivibrator 34 passes through the inverter 35 and emerges therefrom as a binary 0 signal. This binary 0 signal is applied to the Clear inputs C of the flip-flops 59, 60, 63 and 64 and sets them to their 0 states. The same 0 signal is also used to set the first stage of the counter 16 to a state corresponding to decimal 9. The same 0 signal passes through the inverter 36, emerges therefrom as a binary 1 signal, and is applied to the D input of the flip-flop 37, preparing that flip-flop for switching to its binary 1 state at the rise of the next clock pulse.

The next clock pulse from the crystal controlled master clock oscillator 25 energizes the C.P. input of flip-flop 37 and sets that flip-flop to its binary 1 state at a time $t_1$ which is removed from $t_0$ by the phase difference between the rising edge of the signal appearing at the D input of the flip-flop 37 and the rising edge of the next subsequent pulse from the master clock 25.

In a special case, the rising edges of the signals applied to the D and the C.P. inputs of the flip-flop 37 may coincide in time because these signals are independent of each other. However, there will never be a simultaneous application of effective signals to the D, the C.P., and the C inputs of the flip-flop 37, because of the inherent propagation time delay of the multivibrator 34 and of the inverters 35 and 36 which are in the path of the signal from the inverter 33 to the D input of the flip-flop 37.

The binary 1 signal which appears at the 1 output of the flip-flop 37 at time $t_1$ as shown in FIG. 4 energizes the one shot multivibrator 39 and causes a binary 1 signal to appear at its 1 output as illustrated in FIG. 4. This binary 1 signal passes through the inverters 51 and 52, for amplification purposes only, and is applied simultaneously, still at time $t_1$, to the inputs of driving amplifiers 17 and 18.

Driving amplifiers 17 and 19 produce at their outputs at time $t_1$ the rising edges of pulses which are applied respectively to transducers 11 and 12 causing them to emit essentially simultaneous sound signals, as illustrated in FIG. 4.

The width of the pulse produced by the one shot multivibrator 39 is very small, and at time $t_2$, as seen in FIG. 4, the binary 1 signal at its 1 output goes to binary 0, thus discontinuing the excitation of transducers 11 and 12. An output pulse width of about 500 nanoseconds for multivibrator 39 produces a clean sound signal at transducers 11 and 12.

At some later time $t_3$, as illustrated in FIG. 4, the 1 output of multivibrator 34 goes to binary 0. The pulse width of multivibrator 34 can be approximately 100 microseconds.

At this time sonic signals are propagating through both the long and the short columns of mercury of the U-tube manometer 7. The sound signal in the short column reaches the surface 19 and is reflected therefrom. The echo of this sound signal starts propagating down toward the transducer 11. Upon reaching it, the echo signal is converted to an electrical signal and is applied to the input of the receiver 20.

This electrical signal is in the form of a sinusoidal wave which starts with a negative going section.

The first negative going section starts at time $t_4$, as illustrated in FIG. 4. The receiver 20 amplifies and shapes the electrical signal produced by transducer 11. The output of the receiver 20 is applied simultaneously to the level detector 57 and to the zero cross-over detector 58. The outputs of the receiver 20, the level detector 57 and the zero cross-over detector 58 are illustrated in FIG. 4 in an expanded time scale. It is seen that at time $t_4$ the output of the receiver 20 is the beginning of the negative portion of a sine wave.

At time $t_5$ the receiver output signal crosses the 0 voltage level in the positive-going sense. The zero cross-over detector 58 detects this first crossing of the 0 voltage point in the positive direction and puts out at time $t_5$ a positive going pulse. This positive going pulse is applied to the C.P. input of the flip-flop 60. At this time, the flip-flop 59 is at its 0 state, hence the signal applied to the D input of the flip-flop 60 is a binary 0; therefore the flip-flop 60 is not switched at this time from its binary 0 state.

At some later time $t_6$ as determined by the slope of the output of the receiver 20, the voltage level of that output reaches the threshold level of the level detector 57, at which time the positive going edge of a signal appears at the output of the level detector 57. The flip-flop 59 is now set to its binary 1 state and its output is applied to the D input of the flip-flop 60. The flip-flop 60 is not at this time switched from its 0 state because there is no longer a positive going edge applied to its C.P. input.

At some later time $t_7$, as indicated in FIG. 4, the voltage output of the receiver 20 falls below the threshold level of the level detector 57 and the signal at the output detector goes to zero.

At a later time $t_8$, as illustrated in FIG. 4, the output of the receiver 20 crosses the 0 voltage line as a negative going slope and the output of zero cross-over detector 58 goes to zero.

At a later time $t_9$ the output of the receiver 20 again crosses the 0 voltage line as a positive going slope. The output of the zero cross-over detector 58 is now a positive going edge, and the binary 1 signal from the flip-flop 59 is still present at the D input of the flip-flop 60. The flip-flop 60 is now, at time $t_9$, switched to its binary 1 state, as illustrated in FIG. 4. The signal at the 0 output of the flip-flop 60 drops from binary 1 to binary 0 level and the negative going edge of this signal is applied to the one shot multivibrator 21 which has variable time delay. The binary 1 signal from the 1 output of the flip-flop 60 is applied to a delay 601, and from there, to the NAND-gate 67. The multivibrator 21 which is responsive to a negative going edge is switched to its binary 1 stage and a binary 0 appears at its 0 output. This binary 0 signal goes through an amplifier 66 and is applied to NAND-gate 67.

Thus at time $t_9$, one of the inputs of NAND-gate 67 is a logical 1, the other one is a logical 0.

At time $t_{10}$, as shown in FIG. 4, the time delay of multivibrator 21 is over and it switches to its binary 0 state; i.e., a binary 0 signal appears at its 1 output, and a binary 1 signal appears at its 0 output. The NAND-gate 67, now having both its inputs at binary 1 levels, opens and a binary 0 signal appears at its output. This binary 0 signal goes through the inverter 68 and is applied, at time $t_{10}$, as a binary 1 signal, to the NAND-gate 69.

At this time $t_{10}$, three of the four inputs of the NAND-gate 69 are at binary 1 levels. The fourth input comes from the master clock oscillator 25. At the first clock pulse coinciding with or after time $t_{10}$, the NAND-gate 69 is enabled and a binary 0 signal appears at its output. This binary 0 signal goes through the inverter 70 and is applied to the C.P. input of the first counter stage of counter 16 as a binary 1 signal. This stage is now set to a state corresponding to decimal 1. At the drop of the clock pulse from the master clock oscillator 25 the NAND-gate 69 is disabled. It is enabled again at the next clock pulse to apply, through the inverter 70, another binary 1 signal to the C.P. input of the first stage of the counter 16 which will set this stage to a state corresponding to decimal 2, etc.

The counter 16 continues to count the pulses from the master clock oscillator 25 for as long as the three inputs to the NAND-gate 69, other than the input from the master clock oscillator 25, remain at binary 1 levels. The output of the inverter 70, which is the input to counter 16, is also illustrated in FIG. 4.

During all this time, the sound signal emitted from the transducer 12, in the longer mercury column, and its echo have been traveling through the mercury. At some later time $t_{11}$ the echo signal, as reflected by the free surface 26, reaches the transducer 12 and is converted therein to an electrical signal. This electrical signal is applied to the receiver 23, and, from the output of receiver 23, simultaneously to the level detector 61 and to the zero cross-over detector 62. As illustrated in FIG. 4, the output of the receiver 23 starts, at time $t_{11}$, as the negative going portion of a sinusoidal wave.

The zero cross-over detector 62 detects, at time $t_{12}$, the first crossing of the zero voltage line in the positive direction and produces the positive going edge of a signal at its output as shown in FIG. 4. This output does not switch the flip-flop 64 because the flip-flop 63 is, at this time, at its zero state and it is the binary 0 signal from its 1 output that is applied to the D input of the flip-flop 64.

At a later time $t_{13}$ the level detector 61 determines that the voltage at its input has exceeded the threshold level and produces, at its output, the positive going edge shown in FIG. 4.

At later time $t_{14}$, the input of the level detector 61 goes below the predetermined voltage level, and the output of the level detector goes to 0.

At the still later time $t_{15}$, the input to the zero crossover detector 62 crosses the 0 voltage line in the negative direction and the output of the cross-over detector 62 also goes to 0.

At time $t_{16}$, the output of the receiver 23 again crosses the 0 voltage line in the positive direction, and a rising edge appears at the output of the zero crossover detector 62 and sets the flip-flop 64 to its binary 1 state. The signal at the 0 output of the flip-flop 64 now goes to the binary 0 level as shown in FIG. 4, and the NAND-gate 69 is disabled; it can no longer transmit pulses from the master clock oscillator 25 to the counter 16.

The counter 16 now contains the count of the pulses of the clock oscillator 25 for the time span between the reception of the second positive section of the echo sine wave train by the transducer 11, in the short mercury column, and the reception of the second positive section of the echo sine wave train received by the transducer 12, in the long mercury column.

At a later time $t_{17}$, as shown in FIG. 4, the one-shot multivibrator 32 which was set to its binary 1 state by the initiating pulse from the sampling oscillator 14 goes to its binary 0 state, and the signal at its 0 output goes to binary 1. This binary 1 signal passes through inverters 33 and 71 and is applied, still as a binary 1 signal, to the transfer inputs Tr of latches 271, 272, 273, 274 and 275. The latches are now enabled and the contents of the counter 16 are transferred to whatever utilization equipment is connected to the latches.

In the embodiment illustrated, the contents of the counter 16 are transferred to a readout unit 70 which has stages 70-1, 70-2, 70-3, 70-4 and 70-5. Each stage of the readout unit 70 corresponds to one stage of the counter 16 and displays one decimal digit. Each readout stage may have a BCD-to-decimal converter of one decimal digit capacity and a Nixie tube display of one decimal digit capacity. The converters and the Nixie tube displays may be of conventional design; they are not shown explicitly in FIG. 2b.

Some 100 milliseconds after time $t_0$, the sampling oscillator 14 puts out another pulse, as shown in FIG. 4, and the measurement operating cycle described above is repeated.

In the described embodiment, the master clock oscillator 25 may operate at a frequency of 28.25025 megacycles per second. At this operating frequency the Nixie display shows the pressure difference between the two legs of the U-tube manometer 7 directly in inches of mercury, to one thousandth of an inch when the temperature of the mercury in the manometer legs is kept at the predetermined level of 95.0° F and the manometer is at the gravity level of 980.234 cm/sec². The calculation of the operating frequency for the clock oscillator 25 is based on the linear relationship, at constant temperature and gravity, between propagation time and length of the propagation path.

There are three features of particular importance in the above-described embodiment.

The first one is directed to preventing the so-called "last digit bounce." When clock pulses are to be directed to a counter upon the appearance of an enabling signal from a third source, it is possible that the rising edges of the enabling signal and of the clock pulse may, on occasion, coincide. Upon such coincidences, the counter may or may not count the coinciding clock pulse.

To prevent this occurrence, the flip-flop 37 is interposed between the clock oscillator 25 and the sampling oscillator 14 on one hand, and the counter 16 on the other hand. The flip-flop 37 is prepared for switching by an enabling signal originating at the sampling oscillator 14. This enabling signal is applied to the D input of flip-flop 37. The flip-flop 37 is switched to its binary 1 state only upon the appearance of the next subsequent clock pulse from the clock oscillator 25 which is applied to the C.P. input of the flip-flop. A binary 1 level signal must be present at the D input of the flip-flop if a rising edge at the C.P. input is to switch the flip-flop.

The second feature of importance which contributes to accuracy is the combination of level detectors 57 and 61 and zero cross-over detectors 58 and 62.

The first positive sine wave portion at the output of the receivers 20 and 23 may vary substantially in amplitude with the length of travel of the sound signal. As the sound path through the mercury becomes longer, the first positive portion of the sine wave of the echo becomes attenuated and may reach a point where it is indistinguishable from noise signals. The second and third positive portions of the echo sine wave, however, are at least 15 percent to 20 percent stronger in amplitude than the first portion and, for the practical lengths of the mercury columns, are readily distinguishable from noise. The purpose of the level detector and zero cross-over detector networks is therefore to ignore the first positive portion of the echo sine wave and to use instead the crossing of the zero voltage line by the second positive going portion of the electrical manifestation of the echo signal as the instant at which the master clock oscillator 25 is to be connected to or disconnected from the counter 16.

The third feature of particular importance is the use of the variable time delay 21.

In constructing the manometer 7, the transducer 11, in the short column, is deliberately mounted about one-sixteenth inch higher than the transducer 12, in the long column. The higher level of the transducer 11 is compensated for by delaying the signals from it by the use of the multivibrator 21. Note that delaying the signal from the transducer 11 has an effect equivalent to the effect of physically lowering the transducer 11 with respect to the transducer 12.

The multivibrator 21 is utilized in the following manner. The top ends of the tubes 8 and 9 are vented to each other; i.e., the same fluid pressure is applied to the mercury surfaces 19 and 26. The variable resistor 210 associated with the multivibrator is then adjusted until the display 70 shows a count of 00000. I.e., since the counter 16 is set to a state corresponding to decimal 99999 at the beginning of the measurement cycle, the multivibrator 21 is adjusted until only one pulse from the clock oscillator 25 reaches the counter 16.

Thus, a readout of 00000 as displayed by the unit 70 indicates that the measures applied to the two manometer legs are identical (at least identically shown to one thousanth of an inch of mercury). On the other hand, a displayed count of 99999 indicates that the higher fluid pressure has been improperly applied to the surface 26, in the tube 9. The use of the variable delay 21 also avoids the expense of mounting the transducers 11 and 12 precisely in the same horizontal plane, to a high manufcturing tolerance.

In some situations it may be desirable to bounce the sound signals two or more times between the transducers and the free mercury surfaces before using the echos received by the transducers for connecting or disconnecting the clock oscillator 25 and the counter 16.

Figure 3:
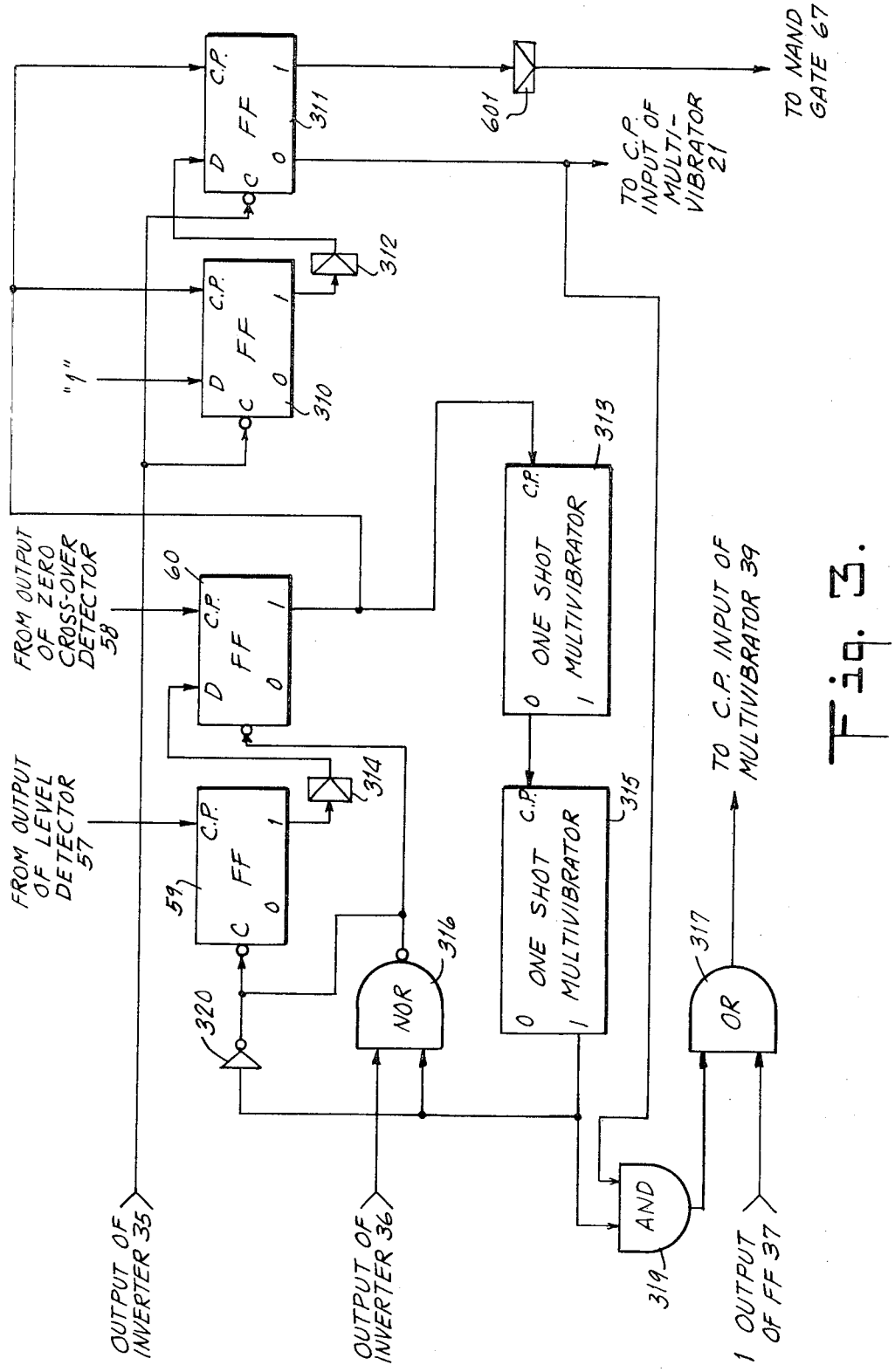
FIG. 3 shows a modification to the embodiment shown in FIG. 2.

FIG. 3 therefore illustrates a modification of the system shown in FIGS. 2A and 2B which allows for multiple bouncing of sound signals.

Description of FIG. 3

The components shown in FIG. 3 are flip-flops 310 and 311 which may be of the same type as the flip-flop 60 described above. One-shot multivibrators 313 and 315 may be of the same type as the one-shot multivibrator 39 described above. Delays 312, 314 and 318 may be of the same type as delay 630 described above. NOR-gate 316 may be a commercially available integrated circuit with characteristics such that its output is a binary one when both its inputs are binary zeros; its output is a binary zero when either or both of its inputs are binary ones. OR-gate 317 may again be a commercially available integrated circuit with characteristics such that its output is a binary 0 when both inputs are binary zeros; and its output is a binary 1 when either or both of the inputs are binary ones.

The operation of the modification illustrated in FIG. 3 will be explained in conjunction with the system illustrated in FIG. 2b. The components shown in FIG. 3 are interposed between the flip-flop 60 of FIG. 2b on one hand, and the multivibrator 21 and delay 601 of FIG. 2b on the other hand. The interconnection is indicated in FIG. 3; the flip-flops 59 and 60 and the delay 601 of FIG. 3 are the same elements as those of FIG. 2b bearing the same reference numerals.

The multivibrators 313 and 315 have very short time constants; for example the multivibrator 313 may have a time constant of 100 microseconds and the multivibrator 315 may have a time constant of 25 microseconds.

When an operating cycle is initiated by a pulse from the sampling oscillator 14, the transducer 11 in the short column is caused to emit a sound pulse toward the mercury surface 19. The sound pulse is reflected from the surface 19 and reaches the transducer 11 as an echo. It is converted therein to an electric signal in the form of sinusoidal waves. The second positive going section of the sinusoidal wave train sets the flip-flop 60 to its binary 1 state. Instead of directing the outputs of the flip-flop 60 to the multivibrator 21 and to the NAND-gate 67, as shown in FIG. 2b, however, the 1 output of the flip-flop 60 is directed to the multivibrator 313 and to the pair of flip-flops 310 and 311 as illustrated in FIG. 3.

The flip-flops of FIG. 3 are reset to their binary 0 state at time $t_0$ which corresponds to the $t_0$ time explained in connection with FIGS. 2 and 4. At time $t_9'$ which corresponds, so far as the flip-flop 60 is concerned, to the time $t_9$ shown in FIG. 4, the flip-flop 60 is set to its binary 1 state.

The binary 1 signal at its 1 output is applied simultaneously to the C.P. inputs of the flip-flops 310 and 311 and of the multivibrator 313. The flip-flop 310 which always has a binary 1 signal applied to its D input is set to its binary 1 state. The flip-flop 311 is not switched from its binary 0 state because the signal present at its D input at this time is a binary 0 (note the delay 312). The multivibrator 313 is set to its binary 1 state and a binary 0 signal appears at its 0 output. After its characteristic time constant, the multivibrator 313 switches to its binary 0 state and the binary 1 signal from its 0 output is applied to the C.P. input of the multivibrator 315.

The multivibrator 315 is now switched to its binary 1 state. The binary 1 signal from its 1 output passes through the inverter 320 and resets the flip-flops 59 and 60 to their binary 0 state. The same binary 1 signal is used as one of the inputs of the AND-gate 319. The other input of the AND-gate 319 comes from the 0 output of the flip-flop 311 and is at this time at a binary 1 level.

The AND-gate 319 is thus enabled and the binary 1 signal from its output is applied, through OR-gate 317 to the multivibrator 39 of FIG. 2b. This causes the transducer 11 to emit a second sound signal. This signal is reflected from the free surface 19, comes back to the transducers 11 as an echo signal and is converted therein to an electrical signal in a form of a series of sinusoidal waves. As described previously, the second positive going section of this series of sinusoidal waves sets the flip-flop 60 of FIG. 3 to its binary 1 state. The binary 1 signal from the 1 output of the flip-flop 60 is again applied to the C.P. input of the flip-flop 311. This time the flip-flop 311 is switched to its binary 1 state because the flip-flop 310 was previously set to 1. The binary 1 signal from the 1 output of the flip-flop 311 is directed, through the delay 601, to the NAND-gate 67 and enables it as described in regard to FIGS. 2b and 4.

The transducer 11 is not at this time retriggered because the binary 0 signal present at the 0 output of the flip-flop 311 disables the AND-gate 319.

The flip-flops 59, 60, 310 and 311 are cleared to their zero states as indicated in FIGS. 2b and 3.

A similar type of network, operating in similar manner, is interposed between the flip-flop 64 associated with the long column and the NAND-gate 69.

In case it is desired to use more than two bounces of the sound signal between the transducers and the free mercury surfaces, additional stages of the type illustrated in FIG. 3 may be used.

For a given difference between the pressures applied to the two manometer legs, the count in the counter 16 would vary with variations of the mercury temperature. Therefore, in order to maintain the high accuracy and precision of the invented manometer system, the mercury temperature must be maintained at or very near a constant predetermined level.

This requirement has been met by enclosing the manometer in a double walled cabinet and maintaining the mercury temperature within 0.1° F of the predetermined level, for example 95° F, by circulating a counterflow of air heated by a system employing both off-on and proportional temperature controls.

FIGS. 5–7

The cabinet enclosing the manometer is illustrated in FIGS. 5, 6 and 7. The cabinet includes an outer shell 501 of sheet metal supported at its bottom end by a plate 500 which is larger than the horizontal cross section of the outer shell 501. The plate 500 rides on 4 casters 505, of which only two are shown. Three leveling screws 506, of which only one is shown, are also attached to the bottom side of the plate 500. The leveling screws 506 which have bottom pads 507 can be rotated to lift the plate 100 and thereby the casters 505, so that the plate 500 rests only on the bottom pads 507 of the leveling screws 506.

A bubble level 508 is mounted on top of the plate 500 outside the outer shell 501. Also mounted on the plate 500 are a plurality of blocks 509 which are inside the outer shell 501 and support three rails 510 which have channel shaped cross-sections. Mounted upon the rails 510, by means of interposed blocks and by means of screws, is a smaller plate 511. A second bubble level 512 is mounted on the top surface of the plate 511. In installing the manometer, the plates 511 and 500 are made to be parallel to each other and perpendicular to the tubes 8 and 9. Thereafter, the two bubble levels must at all times agree. In use of the manometer, the bottom plate 500 may be readjusted to horizontal position by means of the leveling screws 506 and the bubble level 508.

The plate 511 supports two stainless steel cups 513 and 514 onto which the glass tubes 8 and 9 comprising the two legs of the manometer are fitted. Three stainless steel rods 515 extend vertically from the plate 511 to another, smaller plate 516 (visible in FIG. 5) which is parallel to the plate 511. The rods 515 have threaded bottom ends which screw into cooperating threaded recesses in the plate 511. At their tops, the rods 515 terminate into threaded sections of reduced diameter which are inserted through appropriate apertures in the smaller plate 516. The rods are held by nuts resting against the top surface of the plate 516.

The top ends of the glass tubes 8 and 9 terminate shortly below the bottom surface of the plate 516 and are affixed, in an air-tight fit to adapters 544 and 545 respectively. The adapters have threaded portions which protrude through cooperating threaded bores into the plate 516 and have, at their portions extending above the top surface of the plate 516, fittings for separate fluid conduits for applying fluid pressure to the top mercury surfaces 19 and 26.

The glass tubes 8 and 9 are of sufficiently large diameter so that the flat portion of the surface of the mercury columns contained therein is substantially larger than the curved portion of the surface. In tubes of seven-eighths inch diameter for example, the curved surface area is too large in comparison to the central flat surface area and substantial portions of the echoes of the sound signals impinging on the mercury surface are reflected in undesirable directions. The glass tubes used in the described embodiment are 1 7/16 inch in inside diameter, and provide echo signals which are substantially unidirectional and have satisfactory signal-to-noise ratios.

There is no critical diameter above which satisfactory reflected signals are received, and below which unsatisfactory signals are received. The diameter selection is related to the accuracy required, and hence to the desirability of receiving a signal from the flat central portion of the surface which signal is strong enough to drown out reflections from the curved edge portions. Hence, the diameter of the tube should be great enough so that the area of the flat central portion is substantially greater than the area of the curved edge portion, when the latter is projected on a horizontal plane.

A layer of insulation 503 is attached to the inside of the outer shell 501. Inside the outer shell 501 and parallel to and spaced from its vertical walls there is an inner shell 502 which may also have a layer of insulation 504 attached to its inside. The inner shell 502 is attached to the outer shell 501 by a plurality of brackets 519. The inner shell 502 has no top and no bottom. At its bottom end it terminates a short distance above the plate 511; at its top end it terminates a short distance above the plate 516. The outer shell 501 has a door 520 which is hinged, as at 521. The inner shell 502 also has a door 522 which is hinged, as at 523. The door of the outer shell is provided with a window 524; the door 522 of the inner shell has an opening 525 through which a curved thermometer 526 is passed. The graduated section of the thermometer is aligned with the window 524 and is visible through it when both the outer door 520 and the inner door 522 are closed. The bulb of the thermometer 526 is immersed in a mercury bath 527 which is inside the inner shell 502. The purpose of the mercury bath is to make the heat response time of the thermometer 526 substantially equal to the response time of the mercury in the glass tubes 8 and 9.

Brackets 528, on the inside of the outer shell 501 support a chassis plate 529 in the upper part of the cabinet. An electric motor 530 is mounted on the chassis plate 529 by means of studs 531. The shaft of the motor 530 is vertical. The chassis plate 529 also supports electronic components which have been schematically illustrated as boxes 532. The front vertical wall of the outer shell 501 extends up to the top edge 533 while the other three vertical walls extend only to edges 534 which are just above the level of the chassis plate 529. A cover 535 has dimensions equal to those of the horizontal section of the outer shell 501 and cooperates with the top edges 533 and 534 to cover the motor 530 and the electronic components 532. The cover 535 is removable to allow access to the space above the chassis plate 534. The cover 535 may be of perforated sheet metal.

A fan 536 is affixed to the top end of the shaft of the motor 530 and a fan 537 is affixed to the lower end of the shaft of the motor 530. The fan 537 is just below the top edge of the inner shell 502. When the motor 530 is operating, the fan 537 pushes air down through the space enclosed by the inner shell 502. This air leaves the inner shell 502 through the space between the lower edge of the inner shell 502 and the plate 511. The air then travels upward through the free space 537a between the inner and the outer shells and reenters the inner shell through the space between the top edge of the inner shell 502 and the chassis plate 529.

The purpose of the fan 536 is to cool the motor 530 and the electronic components supported by the chassis plate 529.

A thermistor 543 (FIG. 5) is held pressed against the inside of the outer shell 501 by means of a bracket 542. The thermistor senses the temperature of the sheet metal of the outer shell 501 which is substantially equal to the temperature outside the cabinet.

A heating coil 538 is supported below the chassis plate 529 by means of a plurality of ceramic pins 539. The coil 538 is positioned in the path of the air which is pushed down through the inside of the inner shell 502 by the fan 537. Another heating element 540 is mounted, with the use of proper electrical insulation, inside the channel of the central rail 510. The heating elements 538 and 540 are connected electrically in parallel. The bottom side of the chassis plate also supports a temperature responsive cut-out switch 546 whose purpose is to disconnect the power line to the cabinet when the temperature inside it exceeds a certain preset value, for example 120°F.

The inner shell door 522 also supports, on its inside, a mercury thermostat 541.

Neither the electrical connections between the elements illustrated in FIGS. 5–7 nor the conduits mentioned above which attach to the cups 517 and 518 of the manometer are shown in FIGS. 5–7.

FIGS. 8 - 10

FIG. 8 shows in greater detail a portion of the supporting plate 511 and the bottom ends of the manometer legs. The plate 511 has two bores, of which only bore 801 is shown. The bores are for accommodating projections from the bottom ends of the cups 513 and 514, of which only the projection 802, of the cup 514, is shown. The plate 511 also has threaded bores 803 for accommodating the bottom threaded ends of the rods 515; only one is shown.

Each of the stainless cups 513 and 514 encloses a chamber 805. At its upper end the chamber 805 has internal threads 806 which cooperate with the external threads 807 of a phenolic mount 808 for each of the transducers 11 and 12. The threads of the phenolic mounts are ground away in one or more places so as to allow for mercury flow between the glass tubes 8 and 9 and the chambers 805. Only one ground away section 812 is shown.

Each of the cups 513 and 514 has a shoulder 809 which supports the bottom end of the glass tube comprising the manometer leg. A rubber ring 810 seals the glass tubes against the extension 811 of the stainless cup above the shoulder 809.

FIG. 9 shows a cross-sectional detail along lines 9—9 of FIG. 8. The transverse tube 10 is welded to the body of the cup 513 by a weld 901. The transverse tube 10 communicates with the chamber 805 inside the cup 513 through a flapper valve structure 902.

The flapper valve will be described with reference to FIG. 9 and to FIG. 10 which is a cross-sectional view along lines 10—10 of FIG. 9. The flapper valve comprises a thin resilient plate 903 which is fixedly attached transversely to the bore in the cup 513 through which the tube 10 and the chamber 805 communicate. The resilient plate 903 has a C-shaped slit 904 forming a flapper 905. The flapper 905 is in the path of the flow between the chamber 805 and the tube 10 and can be moved by the flow. The flapper 905 creates maximum resistance to flow when the flow between the chamber 805 and the tube 10 is at its minimum; the flapper offers minimum resistance to flow when the flow between the chamber 805 and the tube 10 is at its maximum.

The extent to which the flapper 905 can be deflected by flow from the plane of the resilient plate 903 is limited by two stops 906 and 907 positioned on either side of the plate 903. In the cross-sectional view of FIG. 9 the stops 906 and 907 are seen as two inserts in the bore between the tube 10 and the chamber 805 which abut the resilient plate 903 at their top ends but gradually recede from the plate 903 so as to allow for movement of the flapper 905 away from the plane of the resilient plate 903.

In FIG. 10 the inserts 906 and 907 are seen as each comprising a circular insert 908 which fits tightly and fixedly in the bore between the tube 10 and the chamber 805. The circular insert has a transverse member 909 which acts as the stopper for the flapper 905.

The purpose of the flapper valve 902 is to damp the flow of mercury between the two legs of the manometer. The purpose of the stoppers 906 and 907 is to prevent breaking of the flapper 905 upon excessive surges of flow between the chamber 805 and the tube 10 and also to have the flapper 902 offer a certain fixed nominal value of resistance to flow.

Description of FIG. 11

The use of mercury as working liquid and the designed-in high accuracy of the invented manometer impose particular requirements on the transducers 11 and 12.

The transducers must give a clean fundamental frequency burst of sound with a minimum amount of ringing. The acoustic coupling between the mercury and the transducers must be efficient; i.e., the mercury must wet the top surface of the transducers. Electrical contact must be made to the transducing material. The sound burst must be directed primarily toward the free surface of the mercury column. The portion of the transducer which is exposed to the mercury must not react chemically with it and the physical assembly of the transducer must not be weakened by ultrasonic vibration.

These requirements have been met by the transducer and mount structure illustrated in FIG. 11. The figure shows a crystal wafer 1103 which is a body of polarized polycrystalline lead zirconate - lead titanate crystal with fired silver on both top and bottom sides. Directly above the crystal wafer 1103 there is a silver filled epoxy layer 1102 which electrically and mechanically connects the crystal wafer 1103 with a thin platinum plate 1101. The bottom face of the crystal wafer 1103 is seated into a recess of a phenolic mount 808 by means of a thin epoxy layer 1105. The side of the structure comprising the platinum plate of 1101, the silver filled epoxy layer 1102 and the crystal wafer 1103 is sealed into a position partly into the recess of the phenolic mount 808 by a layer 1106 of material such as "Pliobond" in order to prevent undesirable seepage of mercury.

The phenolic mount 808 has threads 807 which cooperate with the threads 806 in the stainless steel cups 513 and 514. The threads 807 are ground away in one or more sections so as to allow for flow of mercury between the glass tubes 8 and 9 and the chambers 805 inside the cups 513 and 514. One such ground away section is shown in FIG. 8 and identified by reference numeral 812.

The phenolic mount 808 also has a central vertical bore 1107 through which a metal wire 1108 goes to the silver fired bottom surface of the crystal 1103 to which it is electrically connected by a solder joint 1109. The bottom surface of the mount 808 has a groove 1110 into which a resilient O-ring 1111 is seated for contact with the bottom of the chambers 805 of the stainless steel cups 513 and 514. The wires 1108 of the transducers 11 and 12 are lead, with proper installation through the O-rings to jacks 811 and 812 respectively, which are built into the stainless steel cups 513 and 514.

The top surface of the platinum plate 1101 makes electrical contact with the mercury which in turn is in electrical contact with the stainless steel cups 513 and 514. The platinum plate is in turn in electrical contact with the silver fired top face of the crystal 1103 through the silver filled epoxy layer 1102. Electrical contact with the silver fired bottom face of the crystal 1103 is accomplished through the wire 1108 which, with the use of proper insulation, goes to the connections 811 or 812 mounted respectively in the stainless steel cups 513 and 514.

When pulsed by an electrical potential applied across, on one hand, the stainless steel cups 513 and 514 which are in electrical contact with the mercury and, on the other hand, the wires 1108, the transducers constructed as described above emit clean sound bursts of fundamental frequency. In the upward direction, the sound signals propagates in an unrestricted fashion. The sound in the downward direction, however, is substantially absorbed by the phenolic mounts 808 so as not to interfere with the working sound signal in the upward direction. The sound signals in the horizontal direction are of small magnitude and are substantially absorbed by the material which seals the sides of the transducers.

The use of platinum for the plate 1101 which is in contact with the mercury brings about special advantages. Other materials which were considered for contacting the mercury suffered from one or both of the following disadvantages: they were not wetted by the mercury and thus could not assure good electrical and sound transmitting contact, or they reacted chemically with the mercury, by becoming amalgamated. Platinum, however, is wetted by mercury and has excellent acoustical contact with it. Platinum is also chemically neutral with respect to mercury and is not affected by it even after prolonged periods of exposure.

FIGS. 12 and 13

FIG. 12 illustrates in schematic form the control circuit used for maintaining nearly constant predetermined temperature inside the inner shell 502 shown in FIGS. 5 through 7.

In FIG. 12, the resistor 538 is the heating coil identified by the same reference numeral in FIG. 6; the resistor 540 is the heating element identified by the same reference numeral in FIG. 5. A Neon light 1201 is used as an indicator that current is flowing through the resistors 538 and 540; the light 1201 is mounted on the front panel of the outer shell 501 of FIG. 5, above the top edge of the door 520.

In FIG. 12, elements 1207 through 1221, and 1237 are resistors of fixed values. Elements 1222 and 1223 are variable resistors. Elements 1224 through 1229 are capacitors of fixed values. Elements 1230 and 1231 are standard diodes. Elements 1232 are NPN transistors of standard design. Element 1234 is a Triac also of standard design which, when pulsed at its pulse input, conducts through the principal path in either direction until the voltage across the main leads to it changes sign. Elements 1203 and 1204 are coils wound over a core and making up a power transformer with a primary winding connected to a standard 117 volt A.C. line and a 24 volt secondary winding which has a center tap 1205. Primary winding 1235 and secondary winding 1236 make up a pulse transformer which has a magnetic core. Element 1206 is a zero voltage switch trigger which may be a commercial integrated circuit such as the one manufactured by General Electric and identified by Ser. No. PA 424, or it may be an equivalent circuit. It is designed to pulse at the point of zero voltage and therefore to reduce radio frequency interference when used in conjunction with resistive loads.

The purpose of the circuit illustrated in FIG. 12 is to provide both proportional and off-on control over the heating elements 538 and 540. As mentioned in reference to FIGS. 5 through 7, the heating element 538 is in the form of a heating coil which is in the path of the air circulated by the fan 537. The heating element 540 is in the form of a heat sink resistor mounted, with the use of proper insulation, in the channel of the central rail 510. This heating element reduces heat loss through the plate 511 and the cabinet elements below the plate 511.

The element 541 shown in FIG.12 is the mercury-in-glass thermostat identified by the same reference numeral in FIG. 6. In one embodiment of the invention, it is adjusted such that it is open circuit for temperatures up to 95° F., and it is a closed circuit at temperatures over 95° F. The element 543 is the thermistor mounted on the inside of the outer shell 501 and mentioned in the description of FIG. 5. It senses the ambient temperature of the cabinet enclosing the manometer. It is a thermistor of standard design whose resistance varies with temperature in a reasonably linear fashion.

When the temperature inside the inner shell 502 exceeds 95° F., the mercury-in-glass thermostat 541 is a closed circuit and the base of the transistor 1232 is connected through resistor 1217 to the secondary winding 1204 of the power transformer. This connection biases the transistor 1232 such that it conducts. A a result of this, the transistor 1233 also conducts, and no current reaches the primary winding 1235 of the pulse transformer. There is no voltage induced in the secondary winding 1236 of the pulse transformer and the Triac 1234 remains in a nonconductive state. The Triac presents an open circuit and no line current may flow through the heating elements 538 and 540.

When the temperature inside the inner shell 502 drops below 95° F., the mercury-in-glass thermostat 541 becomes an open circuit and the biasing voltage from the secondary winding 1204 of the power transformer can no longer reach the base of the transistor 1232. The heating elements 538 and 540 are then under a proportional control.

The proportional control is based on the fast discharge of the capacitor 1226 across the following elements: resistor 1216, the primary winding 1235 of the pulse transformer, the resistors 1221, 1220, the secondary winding 1204, the diode 1231, the resistor 1207, the integrated circuit 1206 between pins 2 and 11. This fast discharge induces a voltage difference across the secondary winding 1236 of the pulse transformer and causes a pulse current to flow through the diode 1230 which, when applied to the Triac 1234, causes it to conduct. Line current then flows through the heating elements 538 and 540 for as long as the Triac 1234 is conducting.

The capacitor 1226 has a slow charging path through the following elements: the resistor 1216, the primary winding 1235 of the pulse transformer, the resistors 1221 and 1220, the capacitor 1229 and the internal circuitry of the integrated circuit 1206 between pins 2 and 11 thereof.

So long as the capacitor 1226 is being charged, as controlled by the integrated circuit, it fires when the power line voltage goes through zero voltage, and the Triac 1234 is kept conducting.

FIG. 13 illustrates the duty cycles of the heating elements 538 and 540 when under off-on control and when under proportional control. When the temperature inside the inner shell 502 exceeds 95° F. both heating elements are off as shown in the topmost graph of FIG. 13. When the temperature inside the inner shell 502 is slightly below the predetermined temperature of 95° F., the heating elements are under proportional control. Line current then flows through the heating elements for very short periods of time. If the ambient temperature, as detected by the thermistor 543 is slightly below 95° F. the resistance bridge of which the thermistor is an element is unbalanced to the extent of causing the capacitor 1226 to discharge such that the Triac 1234 is made to conduct for very short intervals of time. The heating elements 538 and 540 thus have a duty cycle of the form illustrated in the graph marked 94°F. of FIG. 13.

If the ambient temperature detected by the thermistor 543 is further below 95° F., the resistance bridge of which the thermistor is an element is unbalanced such that the capacitor 1226 is caused to discharge across the primary 1235 of the pulse transformer so as to cause the Triac 1234 to remain in conducting state for longer periods of time. The third graph of FIG. 13 from the top down illustrates the duty cycle of the heating elements 538 and 540 at an ambient temperature of 75° F.

If the ambient temperature detected by the thermistor 543 is 60° F. or below, the resistance bridge to which the thermistor is an element is unbalanced such that the capacitor 1226 is discharged almost every time the power line voltage goes through zero voltage, and the Triac 1234 remains in conducting state almost all the time. The duty cycle of the heating elements 538 and 540 at this temperature is illustrated in the bottom graph of FIG. 13.

Referring again to FIG. 12, the circuit illustrated therein uses a power supply which operates off the secondary winding 1204 of the power transformer and comprises the diode 1231, the capacitor 1225, the resistor 1207 and the Zener diode 1237. The power supply operates in the usual half-wave rectified and regulated fashion. The capacitor 1229 is added to supplement the D.C. power supply during Triac switching. The capacitor 1227 has the function of preventing erratic triggering due to noise. The resistor 1213 isolates the thermistor 543 from interference from the transistors inside the integrated circuit 1206. The circuit comprising the resistors 1208 and 1209 and capacitor 1224 is used to lead the triggering pulse to the Triac 1234 with respect to the A.C. line voltage. The variable resistors 1222 and 1223 are used for balancing the leg of the resistance bridge on which the thermistor 543 is a part so as to cause the proportional control to operate in the proper temperature range. The resistors and capacitors whose function has not been mentioned heretofore are used for balancing, and/or for noise reduction.

The detailed description heretofore has been limited to one particular embodiment of the invention, namely the mercury filled U-tube manometer embodiment. In its broad aspect, however, the invention is in measuring the difference in length between any two paths through a sound transmitting medium, each path being defined at one extremity by the sound emitting face of a transducer and, at the other extremity, by a sound reflective surface. The measure of the difference in length of the two paths is the count of the pulses emitted by a high frequency oscillator between the time the echo of the sound signal in the shorter path is received by the transducer associated with that path and the time at which the echo of the sound signal in the longer path is received by the transducer associated with the longer path.

Thus the invention may be used, for example, in measuring the difference between the lengths of two metal blocks so long as the difference is less than the capacity of the counter 16. In such use the transducer corresponding to the transducer 11 referred to above would be placed against the face of the shorter block, and a transducer corresponding to the transducer 12 referred to above would be placed against the face of the longer block. The measurement would then be initiated by a signal originating in oscillator 14 referred to above and carried out as described in reference to FIGS. 1, 2, 3 and 4. If the transducer 11 has been improperly placed against the longer block, the count indicated by the readout 70 would be 99999 which is not a permissible measure.

As another example, the invention may be used to measure, in a liquid container, the depth of the liquid. In such use a transducer corresponding to transducer 11 would be placed in the liquid and a reflective surface cooperating with it would be placed a fixed distance from its sound emitting face which fixed distance is less than the depth of the liquid. A transducer corresponding to transducer 12 described above would be placed on the bottom of the container such that it emits sound signals upward to the liquid surface. The measurement would then be performed as described in reference to FIGS. 1, 2, 3 and 4 and the count contained in the counter 16 would represent the length by which the depth of the liquid in the container exceeds the fixed distance between transducer 11 and its reflective surface.

What we claim as our invention is:

1. In an ultrasonic measuring device for transducing between sound energy propogating in a column of mercury at ground electrical potential and an electrical potential developed across transducer electrode means, said transducer comprising:
   a. a wafer of piezoelectric ceramic material having opposed flat faces oriented parallel to the upper surface of the mercury column;
   b. a silver coating covering each of the opposing faces of the wafer and in intimate contact therewith;
   c. a thin platinum foil;
   d. a layer of electrically conductive metal-filled epoxy material cementing said platinum foil to the upper silvered face of said wafer whereby said platinum foil is in intimate wetted contact with the mercury to define a first electrode;
   e. a mounting structure of sound absorbing insulative plastic material having a flat surface cemented to the second silvered surface of said wafer and including an opening extending therethrough communicating with said second silvered surface.
   f. an electrical lead extending through the opening in the mounting structure and in electrical contact with said second silver coated surface to define a second electrode electrically insulated from said first electrode and the mercury.
   g. a seal extending from the mounting structure to the edges of the platinum electrode peripherally insulating the margins of said wafer from the mercury, and
   h. means for applying electrical impulses across said wafer and receiving electrical impulses produced by echoes of sound vibrations impinging upon the platinum electrode to yield clean fundamental frequency bursts of sound wih a minimum of ringing.

2. The transducing device of claim 1, in which the piezoelectric material is a fired body of polycrystalline lead titanate-lead zirconate polarized to afford linear piezoelectric response between electrical fields across said electrodes and thickness deformations in said wafer, 3. The transducing device of claim 1 wherein the mounting structure is comprised of a phenolic resin.

* * * * *